United States Patent [19]

Gelardi et al.

[11] Patent Number: 5,251,750
[45] Date of Patent: Oct. 12, 1993

[54] MOLDED CD TRAY AND POP UP ROSETTE THEREFOR

[75] Inventors: Paul J. Gelardi, P.O. Box 127, Cape Porpoise, Me. 04014; John A. Gelardi, Kennebunkport, Me.; David A. Capotosto, Kennebunk, Me.; Anthony L. Gelardi, Kennebunkport, Me.

[73] Assignee: Paul J. Gelardi, Kennebunkport, Me.

[21] Appl. No.: 872,124

[22] Filed: Apr. 22, 1992

[51] Int. Cl.⁵ .............................. B65D 85/57
[52] U.S. Cl. ..................... 206/310; 206/493
[58] Field of Search .................. 206/307–313, 206/444, 493, 807; 426/126

[56] References Cited

U.S. PATENT DOCUMENTS

| | | | |
|---|---|---|---|
| 3,949,114 | 4/1976 | Viola et al. | 426/126 |
| 4,709,813 | 12/1987 | Wildt. | |
| 4,746,013 | 5/1988 | Suzuki et al. | |
| 4,750,618 | 6/1988 | Schubert | 206/310 |
| 4,793,479 | 12/1988 | Otsuka et al. | |
| 4,805,770 | 2/1989 | Grobecker et al. | |
| 4,903,829 | 2/1990 | Clemens. | |
| 5,101,971 | 4/1992 | Grobecker | 206/310 |

FOREIGN PATENT DOCUMENTS

| | | |
|---|---|---|
| 420350 | 4/1991 | European Pat. Off. |
| 3425579 | 1/1986 | Fed. Rep. of Germany. |
| 61-246981 | 4/1986 | Japan. |
| 0205589 | 8/1990 | Japan ............ 206/310 |

OTHER PUBLICATIONS

"Properties of Packaging Films" Chart, *Modern Packaging Encyclopedia 1967*, pp. 145–146.
"Polypropylene and Propylene Copolymers", Jones, *Modern Plastics Encyclopedia 1965*, pp. 259–264.

*Primary Examiner*—Jimmy G. Foster
*Attorney, Agent, or Firm*—James Creighton Wray

[57] ABSTRACT

A compact disc tray incorporates a flat planar surface approximating the size of a compact disc for nesting a compact disc. A central rosette molded to the flat planar surface engages the inner center hole of the CD. The rosette has engagement arms molded to and extending upward from the tray for engaging the center hole, and further extending radially inward towards a molded connection with a center button. The molded connection between the center button and inner ends of the engagement arms provides a living hinge and may be accomplished through reduced thickness in the molded material. Pushing of the center button imparts a downward motion on the inner ends of the engagement arms, which thereby angles the upwardly extending portions of the engagement arms away from the engagement with the center hole of the CD. This releases the CD from the rosette.

10 Claims, 3 Drawing Sheets

MOLDED CD TRAY AND POP UP ROSETTE THEREFOR

BACKGROUND OF THE INVENTION

The present invention relates to holders for compact discs (CDs), specifically holder trays in which CDs are sold and stored. Most current CD holder trays have central engagement means for holding the center hole of a CD when the CD is nested within the tray. Commonly, those engagement means are rosettes. The rosettes usually are a series of tines raised in a circle and radially extending inward towards a center pushing area. When the CD is nested within the tray and the raised portions of the tines engage the center hole, the CD is supposed to be extracted by pushing the center area with the index finger to tilt the raised areas and disengage the CD while simultaneously pulling up on the outer edges of the CD with the thumb and middle finger.

Several problems exist with this method. A first problem relates to the materials with which the tray and rosette are normally constructed. Rigid plastic materials are typically used for the rosette, making it hard to push on the center pushing area without hurting the user's index finger. Therefore, it is common for a user to forego pushing the rosette and simply grasp the outer edges of the CD and force the CD off the rosette. This can cause warping or breaking of the CD and damage to the center rosette.

Alternatively, because of the contortions involved in having to use three fingers to extract the CD, a user may have to use two hands to extract the CD or may try to push the center area without lifting simultaneously. In that case, the rosette reengages the central hole of the CD and the subsequent upward force on the outer edges of the CD unnecessarily damages it.

One present method incorporates a pushing part provided in the rosette of the CD holder tray which ejects the CD as well as disengages the center hole. However, this method is deficient in that it incorporates the use of rigid plastic material, and repeated depression and bending of rigid plastic materials weakens the elastic properties, causing breakage and warping.

There exists a need for a CD holder tray which incorporates a simple central engagement and ejection device, which can be made of inexpensive and easily moldable material which retains its elastic qualities through repeated usages.

Another problem associated with current CD holders is insertion into trays. While optimally depression of the central area aids in extraction of the CD from the tray, the distortions involved make it nearly impossible to depress the central area when inserting the CD into the tray. The difficult procedure involves aligning the center hole with the circle of raised tines and pressing down on the CD until the tines engage the center. This causes undue friction on the edges of the center hole when those edges are forced over the raised sections of the tines. There exists a need for facilitating easier insertion of the CDs onto holder tray.

SUMMARY OF THE INVENTION

In its preferred embodiment, the present invention is a CD tray molded of flexible or semi-elastic material such as polypropylene, or a copolymer of butadene and styrene. The CD tray incorporates a flat planar surface approximating the size of a compact disc for nesting a compact disc. A central rosette molded to the flat planar surface engages the inner center hole of the CD. The rosette has engagement arms molded to and extending upward from the tray for engaging the center hole, and further extending radially inward towards a molded connection with a center button. The molded connection between the center button and inner ends of the engagement arms provides a living hinge and may be accomplished through reduced thickness in the molded material. Pushing of the center button imparts a downward motion on the inner ends of the engagement arms, which thereby angles the upwardly extending portions of the engagement arms away from the engagement with the center hole of the CD. This releases the CD from the rosette.

The engagement arms are preferably tines, having raised sections and central inner ends integrally and livingly hinged to the center button. Areas are formed between the inwardly extending tines, and ejection arms preferably extend radially outwards from an integral connection with the center button into the areas prescribed between the engagement tines. The ejection arms have fulcruming sections extending downward from the integral and living hinge connection with the center button, wherein pressing of the center button forces the fulcruming sections against the tray to fulcrum distal ejection ends of the ejection arms upward through the areas between the tines. Therefore, pressing of the center button releases the raised sections of the engagement tines while concurrently forcing ejection ends of the ejection arms upwards through the areas between the engagement tines, thereby releasing and ejecting the CD from the tray.

In a preferred embodiment, at least one of the integral living hinges between the inner ends of the tines and the center button and the center button and ejection arms is a lock hinge for locking the center button downwards when pressed. This, in turn, holds the ejection arms upwards in an "ejected" position, with ejection ends protruding through the areas between the tines. Therefore, the user compresses the center button to release the CD center hole and eject the CD, with the center button and ejection arms remaining in the "ejected" position. To reinsert the CD, the user positions the center hole over the rosette with the bottom face of the CD resting on the ejection ends of the ejection arms. The engagement areas of the engagement arms are held in an angled position by the locked center button, unlike other rosettes which remain rigid except when being pressed by the user. With the present invention the user applies slight pressure to the upper surface of the CD, which slides the center hole onto the angled engagement tines and simultaneously applies pressure to the "ejected" ejection arms. This pressure unlocks the lock hinges, releases the center button and allows the engagement areas of the engagement arms to grasp and hold the inserted and nested CD.

In a preferred embodiment of the present invention, the lock hinges are molded structures formed between the tines, ejection arms and the center button. The hinges are preferably areas of the mold having decreased diameters, with the decreased diameter allowing increased flexibility in the molded polypropylene or semi-elastic plastic material. The locking function is provided in the present invention by preferably incorporating angled structures on or near these decreased diameter hinges. Other means for providing locking structures on the locking hinges are within the scope of the invention.

In a preferred embodiment, a locking means is provided on the rosette for holding the rosette in a down or "ejected" position. These locking means may be an over-the-center snap-action lock or locking hinges, but providing other locking structures on the tray or rosette is within the scope of this invention.

In one embodiment, the ejection arms have engagement areas for engaging the center hole of a CD when the CD is nested within the tray. Downward movement of the center button causes angling of these engagement areas for release of the center hole with simultaneous ejection by the ejection ends of the ejection arm.

A CD tray has a tray molded of elastic or semi-elastic material, incorporating a flat planar surface for nesting a compact disc. A central rosette is molded into the planar surface for engaging an inner center hole the CD. The rosette has engagement arms integrally hinged to a center button, which is integrally hinged to ejection arms. The engagement arms are inwardly-extending tines of the planar surface which have raised sections for engaging the CD and central ends integrally and livingly hinged to the center button. The ejection arms extend radially outwards from the center buttons into areas prescribed between the engagement tines. The ejection arms have sections extending downward towards the planar face within the areas for fulcruming distal ejection ends upwards through the areas upon depression of the center button.

The CD tray is an integrally molded structure preferably made of molded polypropylene, or a structure of molded material of a copolymer of butadene and styrene.

A locking means locks the rosette in CD-engaging or CD ejecting positions. One locking means is a locking hinge.

The lock hinge incorporates angled features which prescribe the axis of movement between the center button and the engagement tines, or the center button and the ejection arms. The angled features lock the center button in a downward position with ejection ends of the ejection arms in the upward position when the center button is depressed, and hold the center button in the up position with the ejection ends of the ejection arms downward when the ejection ends are depressed.

A rosette engages and ejects a CD within a CD tray. A center toggle lock button is hingedly connected to raised tines of a rosette. The tines have raised sections which engage a center hole of a CD and release the center hole when the toggle lock button is depressed. The toggle lock button is hingedly connected to CD ejection arms extending downward from the button towards a CD tray and radially outward from the button. Depression of the button causes the section of the arm extending downward to abut the CD tray, forcing rotation of the arms at the hinges and causing ejection ends of the ejection arms to move upwards. A locking means is provided on at least one of the hinges for holding the toggle button in the depressed position with the ejection ends in the "up" position, and for holding the toggle button in the "up" position with ejection ends down.

At least one of the hinges between the engagement arms and center button, and the ejection arms and center button, are lock hinges for locking the rosette in CD-engaging or CD ejection positions.

The lock hinge incorporates angled features which prescribe the axis of movement between the toggle button and the engagement tines, or the center button and the ejection arms. The angled features lock the toggle button in a downward position with ejection ends of the ejection arms in the upward position when the center button is depressed, and hold the center button in the "up" positions with the ejection ends of the ejection arms downward when the ejection ends are depressed.

These and further and other objects and features of the invention are apparent in the disclosure, which includes the above and ongoing written specification, with the claims and the drawings.

DETAILED DESCRIPTION OF THE DRAWINGS

Figure 1:
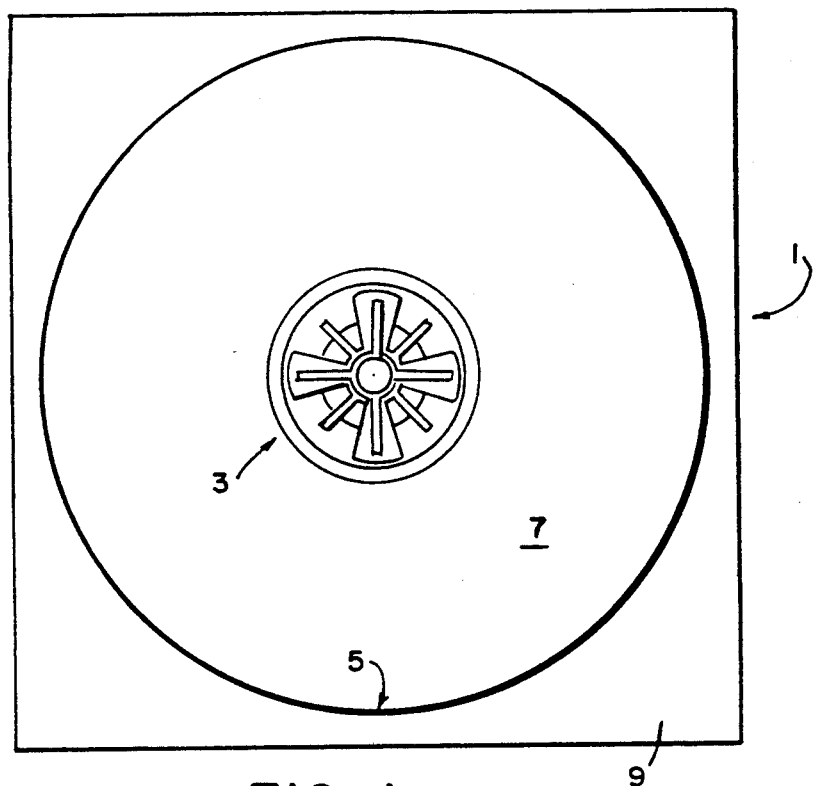
FIG. 1 is a top view of the molded tray rosette.

The molded CD tray, generally indicated by the numeral 1 in FIG. 1, incorporates a central rosette 3, and a circular ledge 5 prescribing a circular planar indentation 7 for nesting a CD. In the present invention, the rosette 3, planar indentation 7 and outer tray section 9 are integrally molded of a flexible or semi-elastic plastic material. Preferred plastics include molded polypropylene or a copolymer of butadene and styrene; however, other materials of similar properties are not beyond the scope of this invention. Rigid plastic materials are not suitable for the present invention due to the properties needed for construction and use of the central rosette 3.

Figure 2:
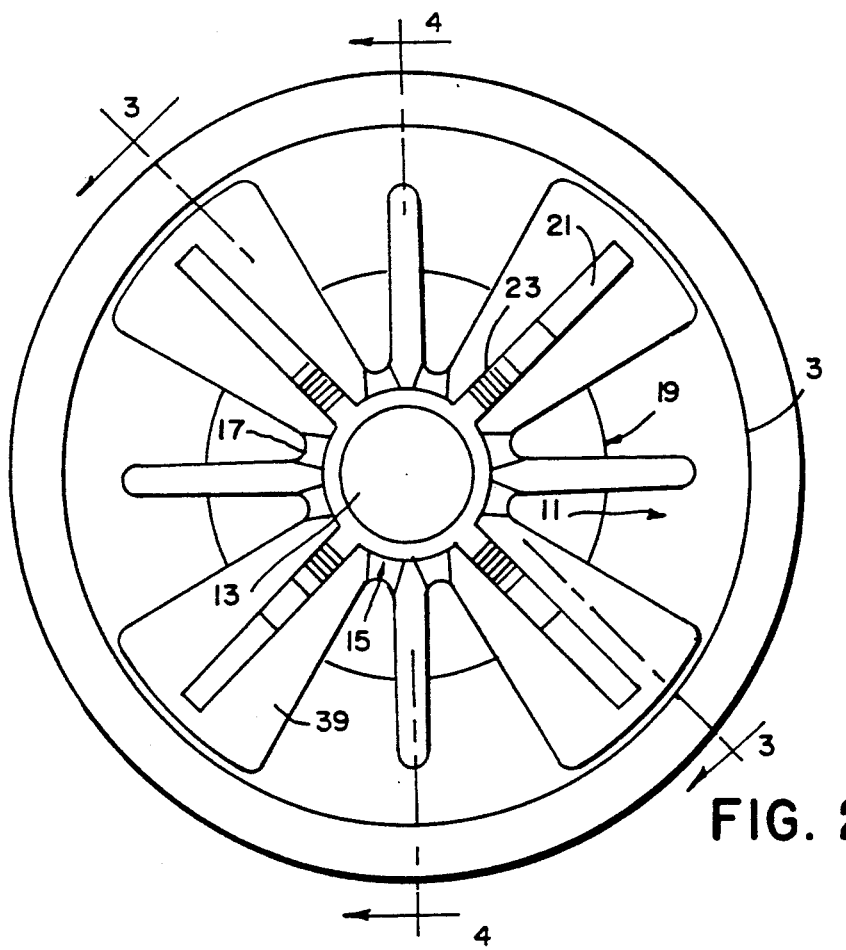
FIG. 2 is a top view of a preferred rosette.
Figure 4:
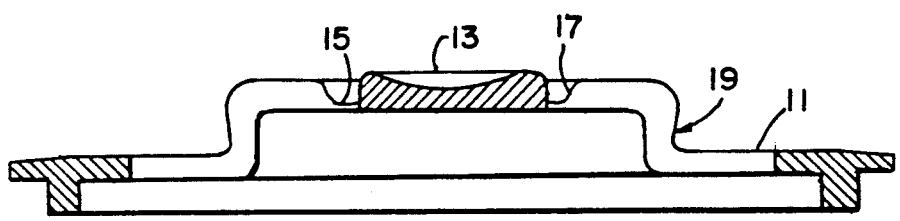
FIG. 4 is a cross-sectional view of the center button and engagement arms along line BB in FIG. 2.

In FIG. 2, a preferred rosette incorporates radial tines or engagement arms 11 which are molded to the CD tray and extend inwardly towards an axis. At the axis of the tines is formed a center button 13 which is connected to the plurality of tines 11 integrally and livingly by molded tine hinges 15, which are preferably reduced diameter sections of molded material between the center button and inner ends 17 of the tines. The tines or engagement arms 11 have raised sections 19, as shown in FIG. 2 and further in FIG. 4, which form a rough circle in conjunction. These raised portions 19 are CD engagement areas on the engagement arms for engaging a center hole of a CD while a CD is nested within the planar indentation 7.

Figure 3:
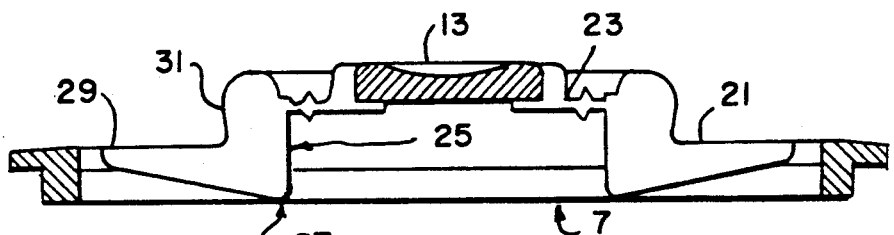
FIG. 3 is a cross-sectional view of the center button and ejection arms along line AA in FIG. 2.

The center button 13 is also integrally molded with and connected to CD ejection arms 21 by ejection arm hinge 23, as shown in FIGS. 2 and 3. In FIG. 3, it can be seen that the ejection arm 21 has a downwardly extending portion 25 extending from the hinge 23 with the center button 13. The downwardly extending portion 25 provides a fulcruming area 27, which lies on or near the planar surface of the indentation 7 or another surface of the tray 1. Opposite the integral and living hinge 23 on the ejection arm 21 are ejection ends 29 for ejecting the CD when a downward motion is imparted on the top of the CD button 13. In one embodiment, the ejection arms can incorporate engagement areas 31 for engaging the central CD hole in lieu of or in conjunction with the raised engaging areas 19 of the engagement arms 11. In another preferred embodiment, lock hinges 23, as shown in FIG. 3, can be incorporated for locking the CD button in a position as prescribed by the user.

Figure 5:
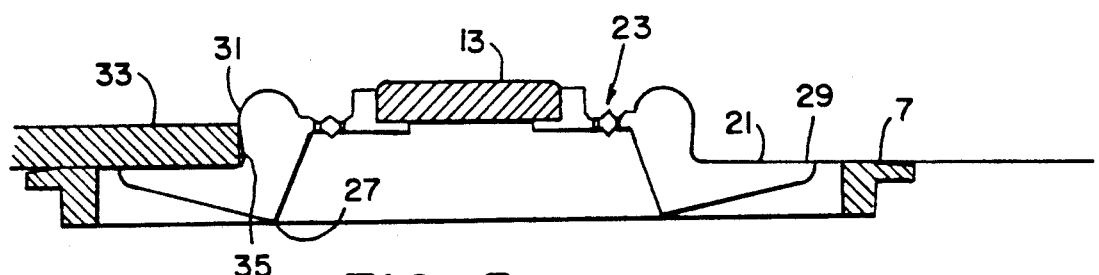
FIG. 5 is a cross-section of the center button, lock hinges and ejection arms showing the nested CD.
Figure 6:
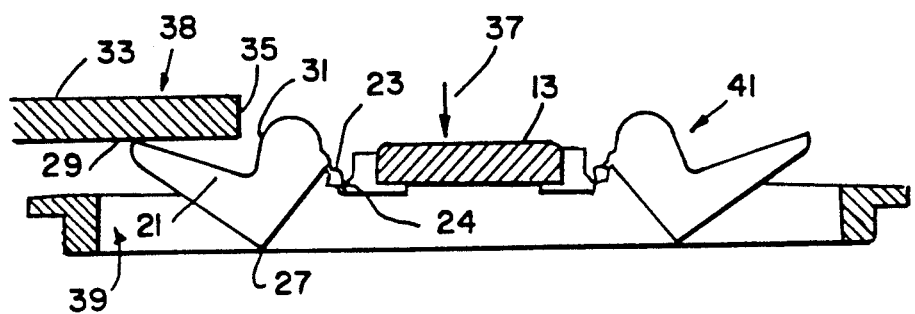
FIG. 6 shows the button in locked position with ejection arms ejecting the CD.
Figure 7:
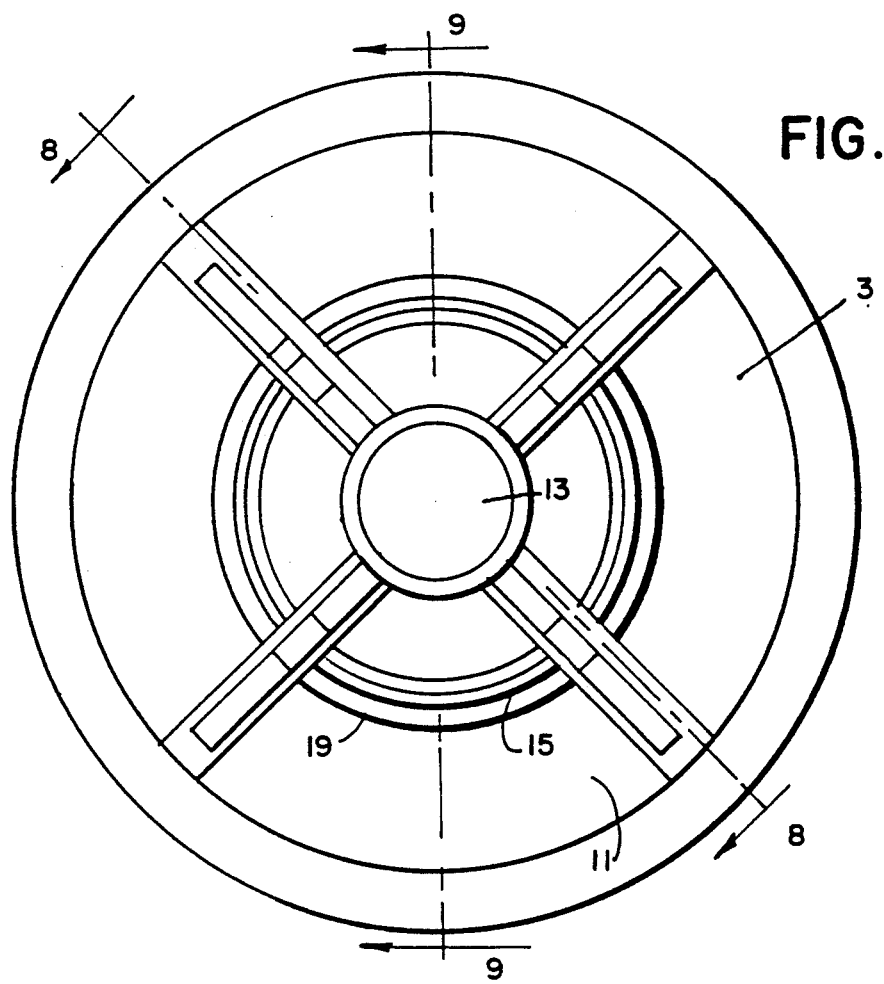
FIG. 7 shows an alternative preferred rosette having large area engagement arms and circumferential lock hinges.

The locking function of the hinges 23 is thus shown in FIGS. 5 and 6. In FIG. 5, a cross-section of the CD center button 13, hinge 23 and ejection arms 21 is shown. A CD 33 is nested on the planar surface 7 of a CD tray with the edges of the CD center hole 35 engaged by the CD engaging areas 31 of the ejection arms, and/or further engaged by the engagement areas 19 of the tines 11 (not shown). The center hole 35 is disengaged from the engagement areas 31 by depression of the center button as indicated by arrow 37 in FIG. 6. This causes rotation of the engagement arms 21 around hinges 23 on fulcruming areas 27, and ultimately angles the engagement areas 31 away from the edges of the center hole 35, thereby releasing the CD from this engagement. The same angling function occurs when the center button is compressed for the engagement areas 19 of the tines 11. Simultaneously, the rotation of the ejection arm 21 on fulcrum 27 forces the ejection ends 29 upward through areas 39 between the tines 11 of the rosette, as shown in FIGS. 2 and 6. This forces the nested CD 33 upwards away from the engagement areas 31 and 19 with the same movement 37 which was used to angle the engagement areas from the CD center hole. In a preferred embodiment, the hinges 23 are lock hinges which have angled features 24 which slightly resist the downward movement 37, but lock into an "ejection" position 41, as indicated in FIG. 6. In this "ejection" position 41, or downwardly compressed position, the angled features lock the center button downwards and hold the ejection ends above the nesting area 7 of the CD. Though angled features are shown, other suitable means or features could be molded onto the hinge center button or ejection arms to provide this function. To release the rosette from the ejection position 41, the user aligns the center hole 35 around the engagement areas 31 of the rosette and presses downward on the CD, as indicated by arrow 38. This unlocks the angled features 24 and reengages the CD on the rosette.

Figure 10:
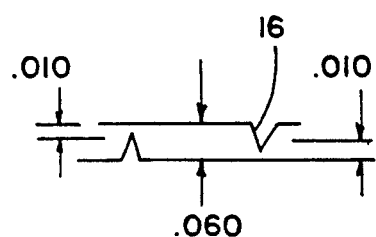
FIG. 10 is a detail of the lock hinges shown in FIG. 9.

Another preferred rosette is shown in FIGS. 7-10. In this case, the rosette has enlarged tines 11 with nearly circumferential CD center hole engagement areas 19 for engaging nearly the entire CD center hole. The hinge 15 between the tine 11 and center button 13 functions as a typical over-the-center snap action lock. A detail of the angled features 16 is shown in FIG. 10 as a preferred embodiment, but other pressure-sensitive features can be added to the center button 13, tines 11 or hinge 15 to provide the locking function as described previously.

Figure 8:
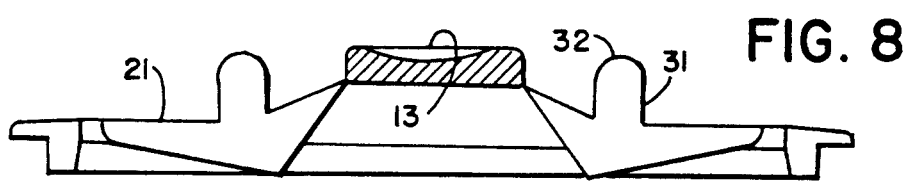
FIG. 8 is a cross-sectional view of the center button and ejection arms with CD engagement sections, shown along line AA in FIG. 7.
Figure 9:
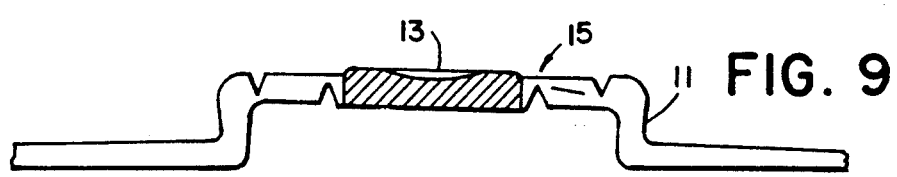
FIG. 9 is a cross-sectional view of the center button and engagement arms showing angled locking hinges along line BB in FIG. 7.

FIG. 8 shows an alternative preferred ejection arm having a bulbous protrusion 32 with engagement area 31.

While the invention has been described with reference to specific embodiments, modifications and variations of the invention may be constructed without departing from the scope of the invention, which is defined in the following claims.

We claim:

1. A CD tray comprising a tray molded of elastic material, incorporating a flat planar surface for nesting a compact disc, a central rosette molded into the planar surface for engaging an inner center hole of the CD, means for locking the rosette in CD-engaging or CD ejection positions, the rosette further having engagement arms integrally hinged to a center button, which is integrally hinged to ejection arms, the engagement arms being inwardly-extending tines of the planar surface having raised sections for engaging the CD and central ends integrally and livingly hinged to the center button, the ejection arms having sections extending downward towards the planar surface within the areas for fulcruming each of a plurality of distal ejection ends upwards through the areas upon depression of the center button.

2. The apparatus of claim 1, wherein the integrally molded structure is made of molded polypropylene.

3. The apparatus of claim 1, wherein the integrally formed structure is of molded material of a copolymer of butadene and styrene.

4. The apparatus of claim 1, further comprising the locking means being a locking hinge.

5. The apparatus of claim 4, further comprising the lock hinge incorporating angled features which prescribe an axis of movement between the center button and the engagement tines, or the center button and the ejection arms, said angled features locking the center button in a downward position with ejection ends of the ejection arms in the upward position when the center button is depressed, and holding the center button in the up position with the ejection ends of the ejection arms downward when the ejection ends are depressed.

6. A rosette for engaging and ejecting a CD within a CD tray, comprising a center toggle lock button hingedly connected to raised tines of a rosette, said tines having raised sections which engage a center hole of a CD and release the center hole when the toggle lock button is depressed, said toggle lock button further hingedly connected to CD ejection arms extending downward from the button towards a CD tray and radially outward from the button, depression of the button causing the section of the arm extending downward to abut the CD tray, forcing rotation of the arms at the hinges and causing ejection ends of the ejection arms to move upwards, locking means provided on at least one of the hinges for holding the toggle button in the depressed position with the ejection ends in an upwards position, and for holding the toggle button in the upward position with ejection ends down.

7. The apparatus of claim 6, further comprising an integrally molded structure made of molded polypropylene.

8. The apparatus of claim 6, further comprising an integrally formed structure of molded material of a copolymer of butadene and styrene.

9. The apparatus of claim 6, wherein the least one of the hinges between the engagement arms and center button, and the ejection arms and center button is for locking the rosette in CD-engaging or CD ejection positions.

10. The apparatus of claim 9, further comprising the lock hinge incorporating angled features which prescribe an axis of movement between the toggle button and the engagement tines, or the center button and the ejection arms, said angled features locking the toggle button in a downward position with ejection ends of the ejection arms in the upward position when the center button is depressed, and holding the center button in an upwards position with the ejection ends of the ejection arms downward when the ejection ends are depressed.

* * * * *